Patented May 12, 1953

2,638,474

UNITED STATES PATENT OFFICE 2,638,474

PROCESS FOR PREPARING MONO-HYDROXYTHIOPHENE

Kenneth L. Kreuz, Fishkill, N. Y., and Charles D. Hurd, Evanston, Ill., assignors to The Texas Company, New York, N. Y., a corporation of Delaware No Drawing. Application August 27, 1948, Serial No. 46,555

4 Claims. (Cl. 260—332.3)

This invention is concerned with novel monohydroxy derivatives of thiophene and in particular 2-thienol. This invention also discloses a novel method for the production of hydroxy thiophene compounds.

2-thienol is a colorless liquid having a characteristic odor and a boiling point of 75° C. at 5 mm. of mercury pressure and of 217–219° C. at atmospheric pressure. On cooling, 2-thienol solidifies in the form of long needles having a melting point of 7 to 9° C. The 2-thienol of this invention rather quickly assumes a reddish color while standing at room temperature; however, when cooled and preserved in the solid form, it can be stored without change for an indefinite period. In a nitrogen atmosphere it may be maintained at its boiling point without appreciable discoloration. It is expected that the 2-thienol of this invention will have particular utility as an intermediate in the preparation of dyes, pharmaceuticals, insecticides, etc.

The preparation of thienol has been unsuccessfully attempted by many investigators. We have prepared thienol and have determined several of its physical constants whereby it may be identified.

We have prepared thienol by reacting oxygen with a thienyl Grignard reagent such as thienyl magnesium bromide in the presence of an alkyl Grignard reagent such as isopropyl-magnesium bromide and hydrolyzing the product thereby obtained. The reaction between thienylmagnesium halide and oxygen is effected at a temperature below about 40° C. and is preferably effected between about 0 and 5° C.

Thienylmagnesium halide and the aliphatic Grignard reagent are prepared in the customary manner. Thienylmagnesium bromide, a preferred reactant, is prepared by reacting magnesium, preferably in the form of finely divided turnings, with 2-bromothiophene dissolved in an inert solvent such as ethyl ether; the aliphatic Grignard reagent is prepared in similar fashion, for example, by reacting isopropyl bromide with magnesium turnings in ether solution. Advantageously both reagents are prepared in situ.

The following example illustrates the method employed for preparing thienol. However, it is to be understood that the invention is not to be construed as limited to this mode of preparation.

16.3 grams of 2-bromothiophene, 18.5 grams of isopropyl bromide and 6.5 grams of magnesium turnings were caused to react in 200 cc. of ethyl ether. The molar ratio of 2-bromothiophene to isopropyl bromide was 0.66. After the Grignard reagents, namely 2-thienylmagnesium bromide and isopropylmagnesium bromide were formed, the reaction mixture was cooled to about 0° C. and dry oxygen was introduced into the closed stirred reaction flask from a gas burette. The oxygen was rapidly adsorbed resulting in a strongly exothermic reaction. The reaction temperature was maintained between 0 and 5° C. Absorption of oxygen ceased when approximately one mol of oxygen had been consumed per mol of bromothiophene. The reaction mixture was allowed to stand under oxygen at about −10° C. overnight, whereupon a dark brown solid phase precipitated therefrom. After hydrolysis of the total reaction product with cold dilute sulfuric acid, 2-thienol was obtained in approximately a 25 mol per cent yield. There was obtained 2.5 grams of dithienyl from the reaction mixture.

2-thienol obtained in this manner is believed to undergo keto-enol tautomerism and to exist in three forms as illustrated by the following equilibrium equation:

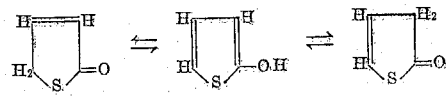

2-thienol boils at 217–219° C. at 760 mm. Hg pressure and has a refractive index of 1.5644 at 20° C. and a density of 1.255 grams per cc. at 20° C. 2-thienol solidifies on cooling in the form of long needles which melt at 7 to 9° C. Elementary analysis of 2-thienol for carbon and hydrogen gave observed values of 48.02 per cent and 4.15 per cent respectively as compared with theoretical values of 47.98 per cent and 4.02 per cent.

2-thienol reacts with acetic anhydride in alkaline solution at 0° C. to give thienyl acetate having a boiling point of 96–97° C. at 25 mm. of mercury pressure. Thienyl acetate thus obtained has an odor similar to that of phenyl acetate. Elementary analysis of 2-thienyl acetate for carbon and hydrogen gave observed values of 50.81 and 4.25 per cent respectively, as compared with calculated theoretical values of 50.68 and 4.25 per cent.

2-thienol reacts with benzoyl chloride to give thienyl benzoate having a melting point of 44–45° C. Elementary analysis of 2-thienyl benzoate prepared in this manner gave observed values of 64.47 per cent for carbon and 3.93 per cent for hydrogen, as compared with calculated theoretical values of 64.68 per cent and 3.95 per cent for the elements in the order named.

Methyl sulfate reacts with 2-thienol in the presence of alkali at reflux temperature to form 2-methoxythiophene having a boiling point of 153–155° C. at atmospheric pressure. Elementary analysis of 2-methoxythiophene gave observed values of 52.77 per cent for carbon and 5.50 per cent for hydrogen, as compared with calculated theoretical values of 52.60 per cent and 5.29 per cent for the elements in the order named.

The existence of 2-thienol in the keto-tautomeric form is proven by the fact that 2-thienol reacts with benzaldehyde to form a benzal condensation product to which the following structural formula has been assigned:

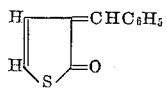

This benzal condensation product, 2-oxo-3-benzylidene -2,3- dihydro-thiophene melts at 97–98° C.; elementary analysis of the condensation product gave observed values of 70.17 per cent for carbon and 4.34 per cent for hydrogen, as compared with calculated theoretical values of 70.19 per cent and 4.28 per cent for the elements in the order named.

2-thienol also couples with diazotized amines.

3-thienol is prepared in a manner similar to that described for the preparation of 2-thienol. 3-thienylmagnesium bromide is oxidized with molecular oxygen in the presence of isopropylmagnesium bromide to yield a product which on hydrolysis with dilute sulfuric acid produces 3-thienol which is sodium hydroxide-soluble and sodium bicarbonate-insoluble. 3-thienol yields a very intense red color on treatment with ferric chloride solution. Coupling with diazotized amines in alkaline solution gives rise to a red-brown solid.

The method of the invention is also applicable to the preparation of substituted thienols. Thus, 3-methyl-2-thienol can be prepared by the oxidation of 3-methyl-2-thienylmagnesium bromide with oxygen in the presence of an alkylmagnesium halide followed by hydrolysis of the precipitate thereby obtained.

In the detailed description of the invention, thienylmagnesium bromide has been employed for the preparation of thienol. Other thienylmagnesium halides may be employed but best results appear to be obtained with thienylmagnesium bromide. Moreover, alkylmagnesium halides other than isopropylmagnesium bromide may be employed as the modifying agent; cyclohexylmagnesium bromide and isobutylmagnesium chloride may be used as the modifying agents.

Obviously many modifications and variations of the invention, as hereinbefore set forth, may be made without departing from the spirit and scope thereof and, therefore, only such limitations should be imposed as are indicated in the appended claims.

We claim:

1. A method for preparing hydroxythiophene compounds which comprises reacting thienylmagnesium halide alkylmagnesium halide and oxygen and hydrolyzing the product thereby obtained.

2. A method for preparing hydroxythiophene compounds which comprises reacting at temperatures below 40° C. thienylmagnesium halide, oxygen and alkylmagnesium halide, the mol ratio of magnesium halide to thienylmagnesium halide being at least one and hydrolyzing the product thereby obtained.

3. The method according to claim 2 in which thienylmagnesium halide is thienylmagnesium bromide.

4. The method according to claim 2 in which the alkylmagnesium halide is isopropylmagnesium bromide.

KENNETH L. KREUZ.
CHARLES D. HURD.

References Cited in the file of this patent

UNITED STATES PATENTS

| Number | Name | Date |
|---|---|---|
| 2,400,095 | Borglin | May 14, 1946 |

OTHER REFERENCES

Mentzer, Chem. Abstracts, 40, 2828–2829 (1946).

Steinkopf, "Die Chemie des Thiophenes," page 62, 1941. Edwards Lithoprint 1944.

Morton, "The Chemistry of Heterocyclic Compounds," Ed. 2, p. 50, McGraw-Hill, 1946.

Weygand, "Organic Preparations," p. 154, Interscience Publ., N. Y., 1945.